United States Patent
Brandt et al.

(10) Patent No.: US 7,656,408 B1
(45) Date of Patent: Feb. 2, 2010

(54) METHOD AND SYSTEM FOR ANIMATING A BORDER

(75) Inventors: Jonathan Worthen Brandt, Santa Cruz, CA (US); Nathan A. Carr, Santa Clara, CA (US)

(73) Assignee: Adobe Systems, Incorporated, San Jose, CA (US)

( * ) Notice: Subject to any disclaimer, the term of this patent is extended or adjusted under 35 U.S.C. 154(b) by 694 days.

(21) Appl. No.: 11/351,802

(22) Filed: Feb. 10, 2006

(51) Int. Cl.
*G06T 15/00* (2006.01)

(52) U.S. Cl. .................. 345/473; 382/145; 382/199

(58) Field of Classification Search .......... 345/473, 345/474, 475; 382/145, 199
See application file for complete search history.

(56) References Cited

U.S. PATENT DOCUMENTS

| | | | |
|---|---|---|---|
| 6,687,402 B1 | 2/2004 | Taycher et al. | |
| 6,744,913 B1 | 6/2004 | Guest et al. | |
| 6,963,664 B2 | 11/2005 | Braspenning et al. | |
| 7,057,630 B2 * | 6/2006 | Parent et al. | ............... 345/698 |
| 7,340,089 B2 * | 3/2008 | Nair et al. | ................... 382/159 |
| 7,492,972 B2 * | 2/2009 | Bober | ....................... 382/305 |
| 2005/0190991 A1 | 9/2005 | McCleese | |
| 2005/0201632 A1 | 9/2005 | Sakakima | |
| 2005/0254728 A1 | 11/2005 | Wang | |
| 2005/0270310 A1 | 12/2005 | Jeffrey | |

* cited by examiner

*Primary Examiner*—Phu K Nguyen
(74) *Attorney, Agent, or Firm*—Robert C. Kowert; Meyertons, Hood, Kivlin, Kowert & Goetzel, P.C.

(57) ABSTRACT

The animation of a border is described. A border associated with a portion of an image is provided. The border comprises pixels and the pixels are animated such that the pixels move in a direction within the border. The direction is configured to identify a location of the portion of the image.

25 Claims, 11 Drawing Sheets

METHOD AND SYSTEM FOR ANIMATING A BORDER

FIELD OF THE INVENTION

The present invention relates generally to software and, more particularly, to methods and systems for animating a border.

BACKGROUND

The marching ants effect is an animation technique typically found in selection tools of computer graphics programs. A portion of an image may be selected using the selection tools to alter the selected portion's attributes without affecting the rest of the image. For example, FIG. 1A shows image 110 with portions 106 and 104. Portion 104, which is in the shape of a rectangle, may be selected and dotted border 112 defines a boundary of the selected portion. To highlight dotted border 112, the dotted border may be animated such that the dots move from one corner of the dotted border to another opposing corner of the dotted border. For example, the dots can move diagonally from the bottom, right corner to the top, left corner.

As shown in FIG. 1A, with full view of image 110 and dotted border 112, a user can easily see that the selected portion is portion 104. However, a user may not be able to distinguish a selected portion, such as portion 104, from a non-selected portion, such as portion 106, if only a portion of dotted border 112 is shown. For example, FIG. 1B is a diagram of an enlarged region of the image shown in FIG. 1A. As shown in FIG. 1B, enlarged region 108 of the image, which is also shown in FIG. 1A, shows portions 104 and 106 and a portion of dotted border 112. Without a view of the complete image and dotted border 112, selected portion 104 is difficult to distinguish from portion 106. For instance, a user viewing only enlarged region 108 can mistake portion 106 as the selected portion instead of portion 104.

In view of the foregoing, there is a need to further improve graphical indication of image selections.

BRIEF DESCRIPTION OF THE DRAWINGS

Various embodiments of the invention are disclosed in the following detailed description and the accompanying drawings.

DETAILED DESCRIPTION

Various embodiments of the invention may be implemented in numerous ways, including as a system, a process, an apparatus, or a series of program instructions on a computer readable medium such as a computer readable storage medium or a computer network where the program instructions are sent over optical or electronic communication links. In general, operations of disclosed processes may be performed in an arbitrary order, unless otherwise provided in the claims.

A detailed description of one or more embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

The embodiments described herein provide techniques for processing a border associated with a selected portion of an image. In an embodiment, the border that defines a boundary associated with the selected portion of the image is animated such that the pixels of the border move in one direction within the border. As explained in more detail below, the direction of movement identifies a location of the selected portion of the image.

Figure 1A:
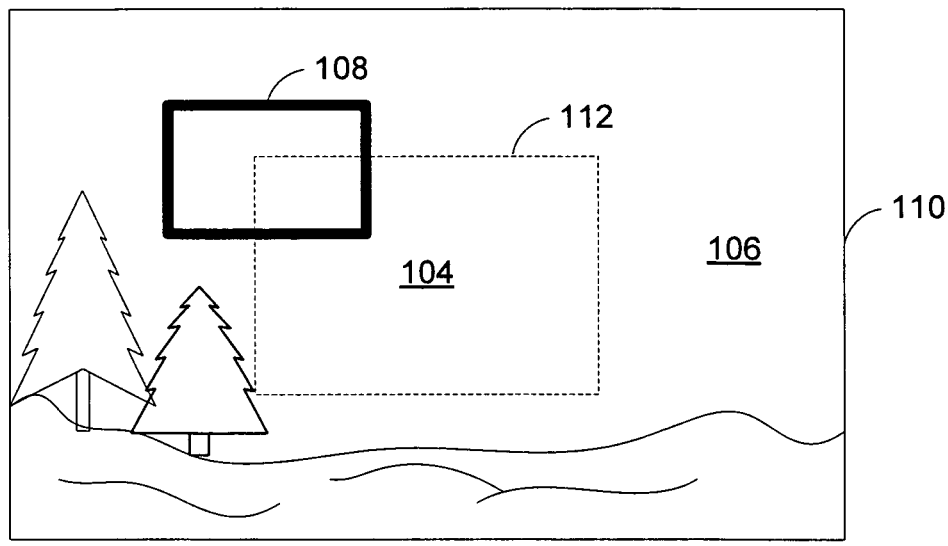
FIGS. 1A and 1B are diagrams of a conventional border defining a boundary associated with a selected portion of an image.
Figure 1B:
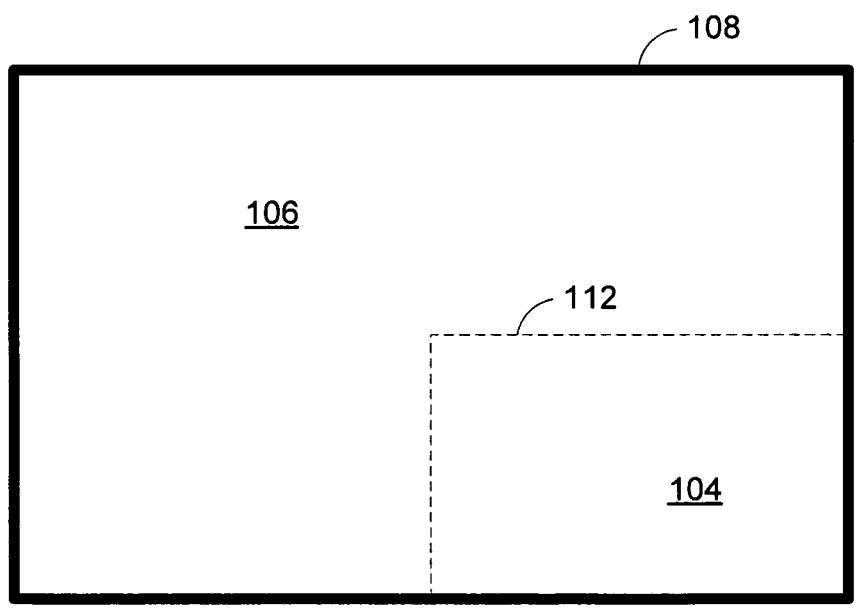
Figure 2A:
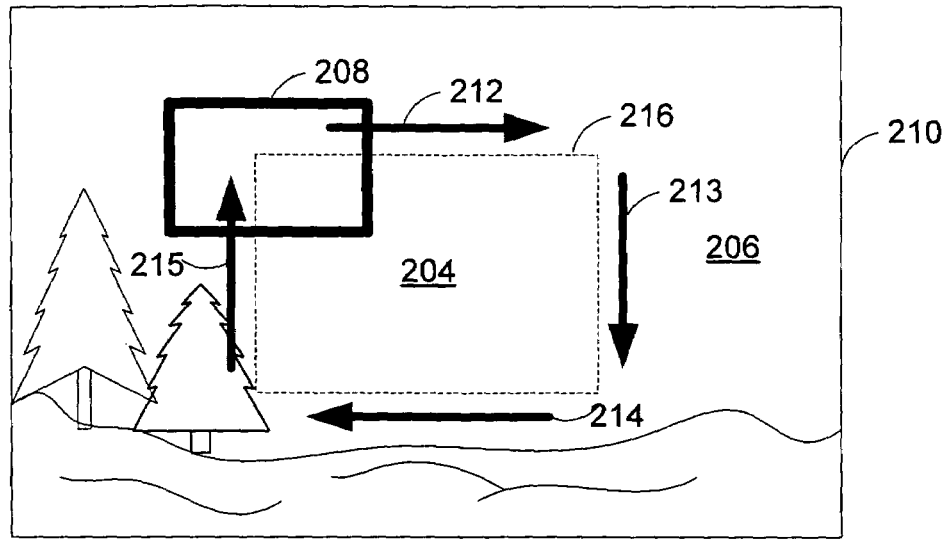
FIGS. 2A and 2B are diagrams of an exemplary animated border that identifies a location of a portion of an image, in accordance with an embodiment.
Figure 2B:
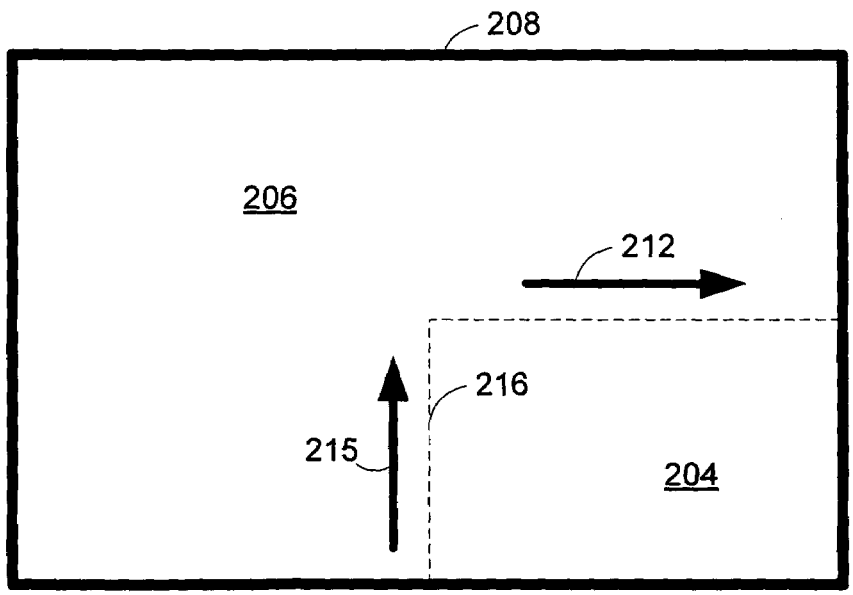

FIGS. 2A and 2B are diagrams of an exemplary animated border that identifies a location of a portion of an image, in accordance with an embodiment. FIG. 2A shows image 210 and selected portion 204 or a subset of the image selected. Border 216 defines a boundary of selected portion 204. In other words, border 216 identifies the outer edges of selected portion 204, and in this embodiment, encloses the selected portion. A user may select portion 204 to alter the selected portion's color, position, shape, texture, and/or other attributes without affecting the rest of image 210, such as portion 206. As used herein, it should be noted that the terms "selected portion 204" and "portion 204" may be used interchangeably. Portion 204 of image 210 may be selected by a variety of selection tools. Exemplary selection tools include marquee tools, lasso tools, magic wand, and other selection tools. The marquee tools may be used to select a shaped portion, such as rectangularly shaped portion 204. Other exemplary shapes include elliptical shapes, triangular shapes, a single column, a single row, and other shapes. Lasso tools can be used to select an irregularly shaped portion. For example, Lasso tools can be used to select a portion of image 210 having a polygon shape. A magic wand can be used to select a portion, such as portion 204, based on one or more attributes (e.g., color) of the portion.

To identify selected portion 204, border 216 is animated such that the border moves in the direction indicated by reference arrows 212-215. As shown in FIG. 2A, border 216 is rotating in a clockwise direction as indicated by reference arrows 212-215. The clockwise direction identifies portion 204 as the selected portion and not portion 206 that is outside border 216. The location of selected portion 204 is identified relative to the direction of movement. For example, in an embodiment, with dashed lines (or other graphics) that define border 216 as reference, selected portion 204 is located towards the right of direction of movement as indicated by reference arrows 212-215. In other words, selected portion 204 is located towards a side perpendicular to line segments that comprise border 216 and the side relative to the line segments can be identified by the direction of movement of the line, as discussed above.

Accordingly, with reference to the top, horizontal line of border 216 moving from left to right as indicated by reference arrow 212, selected portion 204 is located towards the right of direction of movement or is located below the top, horizontal line. With reference to the right, vertical line of border 216 moving from top to bottom as indicated by reference arrow 213, selected portion 204 is located towards the right of direction of movement or is located on the left of the right, vertical line. With reference to the bottom, horizontal line of border 216 moving from right to left as indicated by reference arrow 214, selected portion 204 is located towards the right of direction of movement or is located on top of the bottom, horizontal line. With reference to the left, vertical line of border 216 moving from bottom to top as indicated by reference arrow 215, selected portion 204 is located towards the right of direction of movement or is located on the right of the left, vertical line.

FIG. 2B is a diagram of an enlarged region of the image shown in FIG. 2A. As shown in FIG. 2B, enlarged region 208 of the image, which is also shown in FIG. 2A, shows portions 204 and 206 and a portion of border 216. The location of selected portion 204 can be identified by direction of movement of border 216. Without a view of the complete image and without animation of border 216, selected portion 204 may be difficult to distinguish from non-selected portion 206. With dashed lines that define border 216 as reference, portion 204 is located towards the right of direction of movement as indicated by reference arrows 212 and 215. Accordingly, with reference to vertical line of border 216, selected portion 204 is located towards the right of direction of movement from bottom to top as indicated by reference arrow 215 or is located on the right of the vertical line. With horizontal line of border 216, selected portion 204 is located towards the right of direction of movement from left to right as indicated by reference arrow 212 or is located on the bottom of the horizontal line.

Figure 3A:
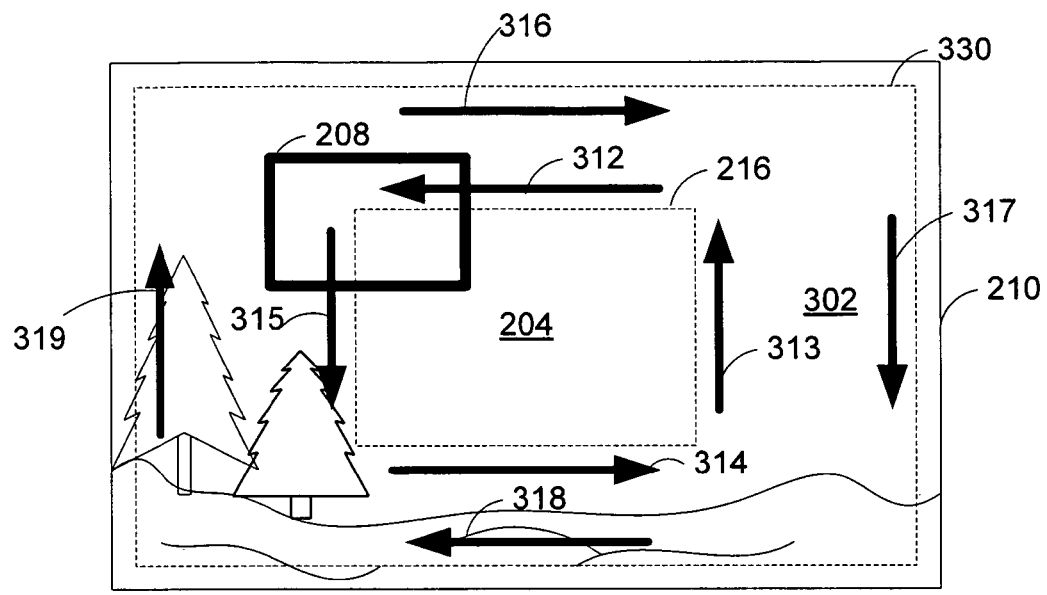
FIGS. 3A and 3B are diagrams of other exemplary animated borders that identify another selected portion of an image, in accordance with an embodiment.
Figure 3B:
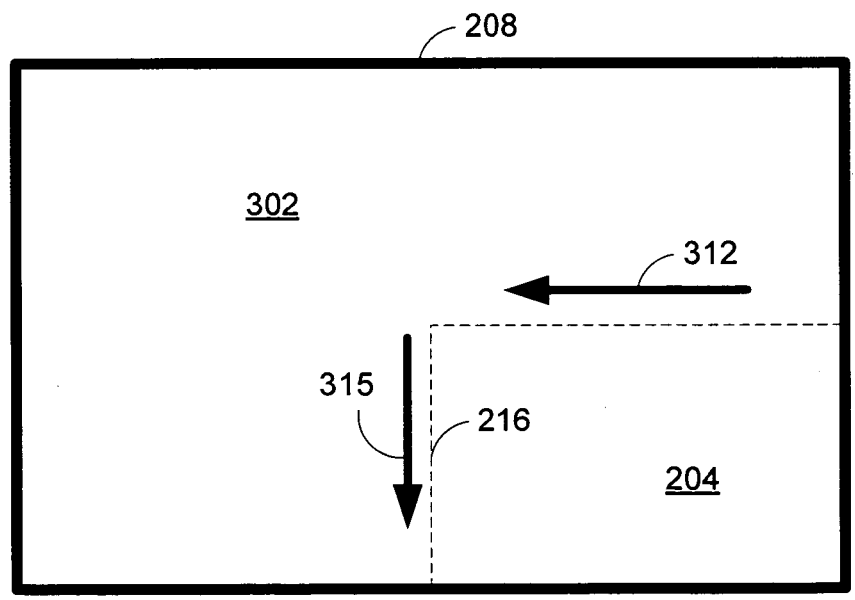

FIGS. 3A and 3B are diagrams of other exemplary animated borders that identify another selected portion of an image, in accordance with an embodiment. As shown in FIG. 3A, image 210 includes portions 204 and 302. Border 216 identifies the outer edges of portion 204 of image 210. Portion 302 is identified as the portion of image 210 between borders 330 and 216. Here, portion 302 is selected and therefore, borders 330 and 216 define the boundary of the selection portion. In other words, borders 330 and 216 identify the outer edges of portion 302. As used herein, it should be noted that the terms "selected portion 302" and "portion 302" may be used interchangeably.

To identify selected portion 302, borders 330 and 216 are animated such that the borders move in opposite directions as indicated by reference arrows 312-319. Border 330 rotates in a clockwise direction as indicated by reference arrows 316-319 while border 216 rotates in a counterclockwise direction as indicated by reference arrows 312-315. As discussed above, location of selected portion 302 is identified relative to the direction of movement. For example, in an embodiment, with dashed lines that define borders 216 and 330 as reference, selected portion 302 is located towards the right of direction of movement as indicated by arrows 312-319. Accordingly, with reference to the top, horizontal line of border 216, selected portion 302 is located towards the right of direction of movement from right to left as indicated by reference arrow 312 or is located on top of the top, horizontal line. With reference to the right, vertical line of border 216, selected portion 302 is located towards the right of direction of movement from bottom to top as indicated by reference arrow 313 or is located on the right of the right, vertical line. With reference to the bottom, horizontal line of border 216, selected portion 302 is located towards the right of direction of movement from left to right as indicated by reference arrow 314 or is located below the bottom, horizontal line. With reference to the left, vertical line of border 216, selected portion 204 is located towards the right of direction of movement from top to bottom as indicated by reference arrow 315 or is located on the left of the left, vertical line.

Furthermore, with reference to the top, horizontal line of border 330, selected portion 302 is located towards the right of direction of movement from left to right as indicated by reference arrow 316 or is located below the top, horizontal line. With reference to the right, vertical line of border 330, selected portion 302 is located towards the right of direction of movement from top to bottom as indicated by reference arrow 317 or is located on the left of the right, vertical line. With reference to the bottom, horizontal line of border 330, selected portion 302 is located towards the right of direction of movement from right to left as indicated by reference arrow 318 or is located on top of the bottom, horizontal line. With reference to the left, vertical line of border 330, selected portion 302 is located towards the right of direction of movement from bottom to top as indicated by reference arrow 319 or is located on the right of the left, vertical line.

FIG. 3B is a diagram of an enlarged region of the image shown in FIG. 3A. As shown in FIG. 3B, enlarged region 208 of the image, which is also shown in FIG. 3A, shows portions 204 and 302 and a portion of border 216. The location of selected portion 302 can be identified by direction of movement of border 216. Without a view of both border 216 and border 330 of FIG. 3A and without animation of border 216, selected portion 302 may be difficult to distinguish from portion 204. Returning to FIG. 3B, with dashed lines that define border 216 as reference, selected portion 302 is located towards the right of direction of movement as indicated by arrows 312 and 315. Accordingly, with reference to vertical line of border 216, selected portion 302 is located towards the right of direction of movement from top to bottom as indicated by reference arrow 315 or is located on the left of the vertical line. With horizontal line of border 216, selected portion 302 is located towards the right of direction of movement from right to left as indicated by reference arrow 312 or is located on top of the horizontal line.

Figure 4:
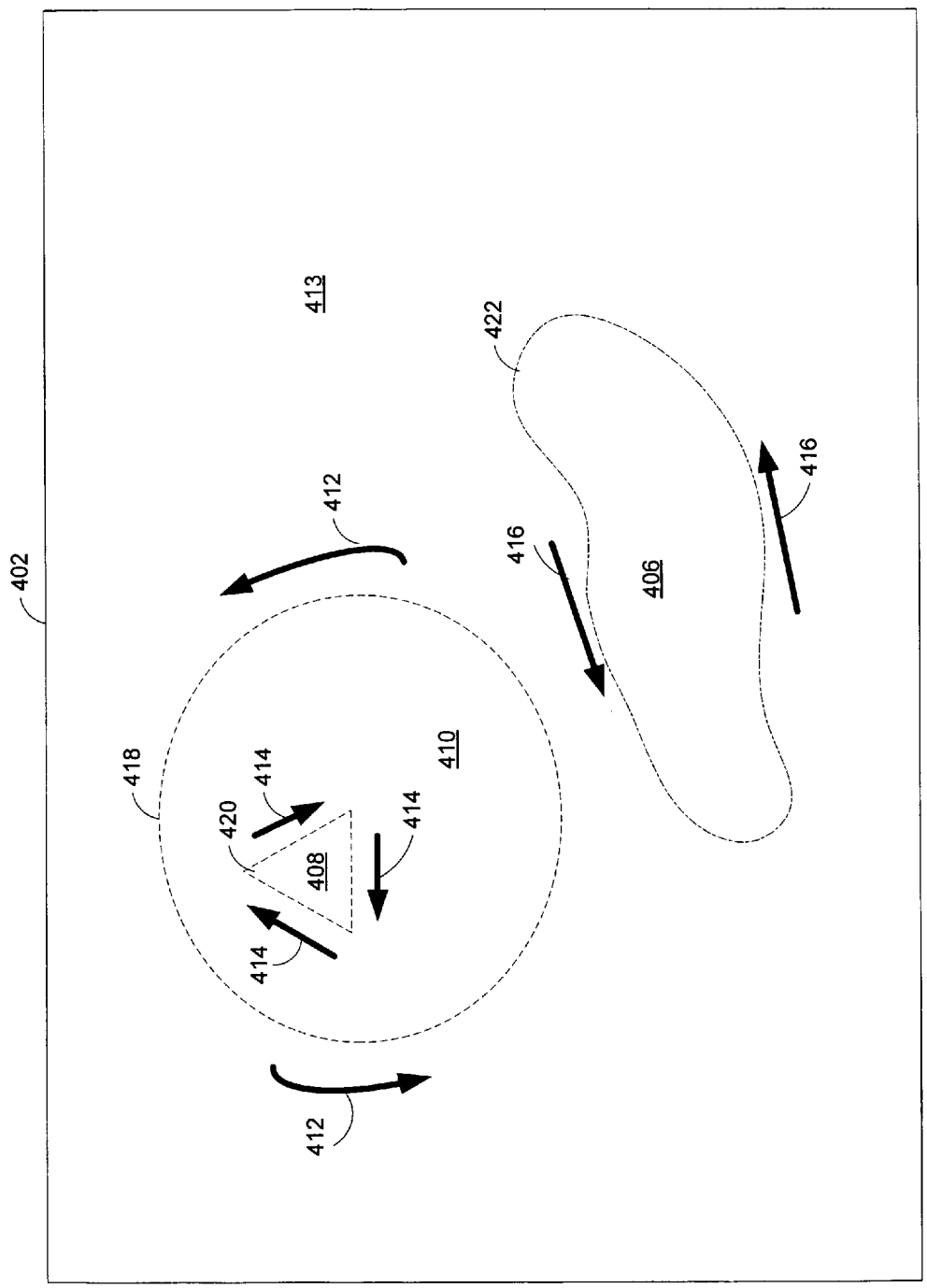
FIG. 4 is a diagram of additional exemplary borders that define multiple portions of an image, in accordance with an embodiment.

FIG. 4 is a diagram of additional exemplary borders that indicate multiple portions of an image, in accordance with an embodiment. As shown in FIG. 4, image 402 can be divided into multiple portions 406, 408, 410, and 413 and here, portions 406 and 410 are selected. Borders 418, 420, and 422 indicate or define the boundaries of selected portions 406 and 410. As discussed above, the location of selected portions 406 and 410 are identified relative to the direction of movement of borders 418, 420, and 422. In the embodiment shown in FIG. 4, borders 418, 420, and 422 or the pixels that comprise the borders are moving in a rotating direction. Borders 422 and 418 move in a counterclockwise direction while border 420 moves in a clockwise direction. As discussed above, in an embodiment, a portion can be located towards the right of direction of movement. However, in another embodiment, it should be appreciated that portions, such as portions 406 and 410, can be located toward the left of direction of movement as indicated by reference arrows 412, 414, and 416.

As a result, the counterclockwise rotation of border 422 as indicated by reference arrows 416 identifies the location of selected portion 406 as inside the border. Furthermore, the counterclockwise rotation of border 418 as indicated by reference arrows 412 identifies the location of selected portion 410 as inside the border. However, the clockwise rotation of border 420, which is located inside border 418, as indicated by reference arrows 414, identifies the location of selected portion 410 as outside border 420. Accordingly, selected portion 410 can be defined as triangle shaped portion 408 subtracted from the elliptical shaped portions 408 and 410 as defined by border 418.

Figure 5:
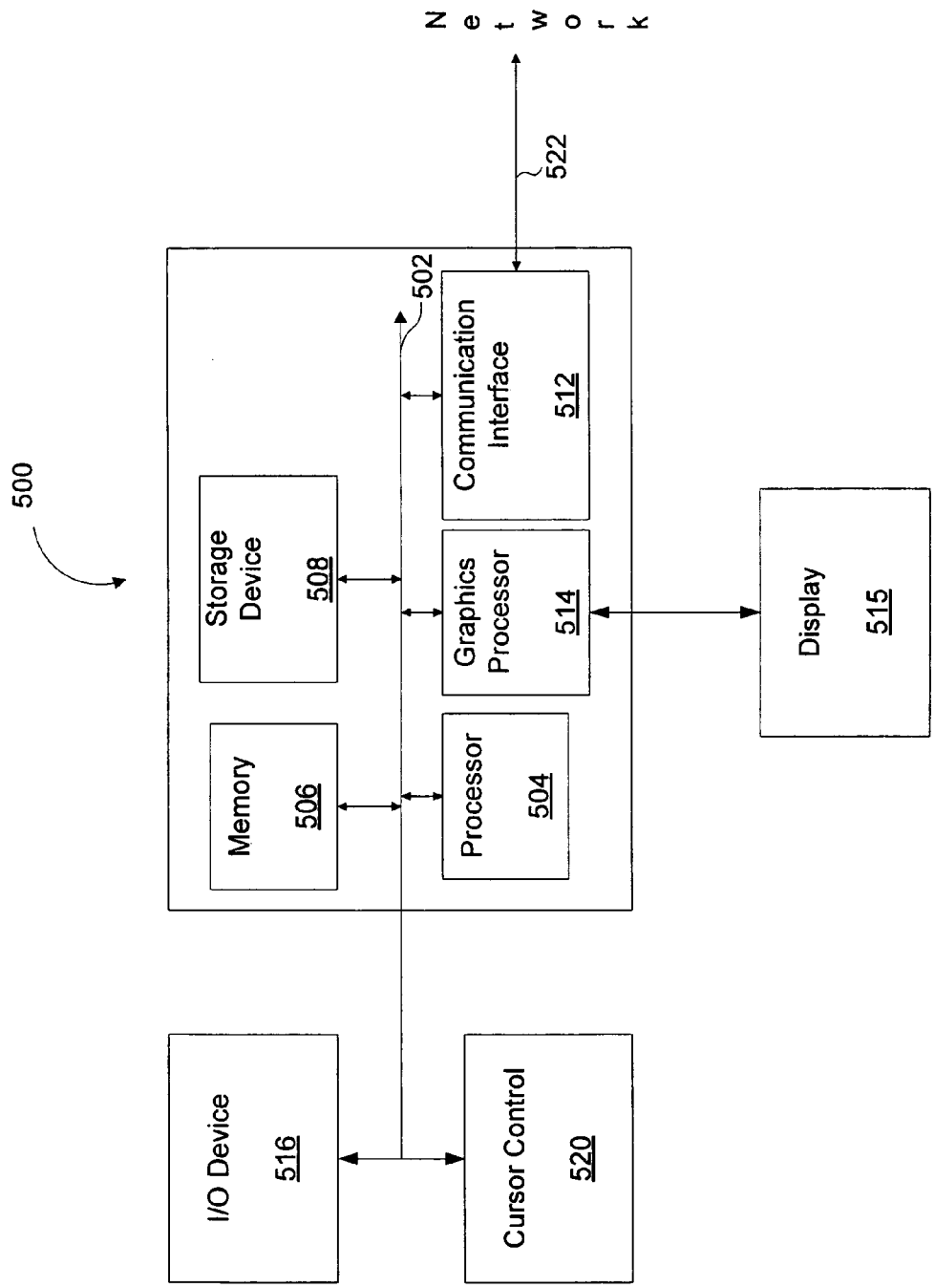
FIG. 5 is a simplified block diagram of an exemplary computer system suitable for processing borders associated with selected portions of an image, in accordance with an embodiment.

FIG. 5 is a simplified block diagram of an exemplary computer system suitable for processing borders associated with selected portions of an image, in accordance with an embodiment. In some embodiments, computer system 500 may be used to implement computer programs, logic, applications, methods, processes, or other software to process one or more borders. Exemplary computer system 500 includes a desktop computer, a server, a portable computing device, a personal digital assistant, a computational engine within an appliance, and other computer systems. As shown in FIG. 5, computer system 500 includes bus 502 or other communication mechanism for communicating information, which interconnects subsystems and devices, such as processor 504, graphics processor 514, system memory 506 (e.g., random access memory (RAM)), storage device 508 (e.g., read only memory (ROM), magnetic disk drives, optical disk drives), communication interface 512 (e.g., modem or Ethernet card), input/output device 516 (e.g., keyboard), and cursor control 520 (e.g., mouse or trackball). Computer system 500 additionally includes display 515 (e.g., cathode ray tube (CRT) or liquid crystal display (LCD)) that is connected to or in communication with graphics processor 514.

In some embodiments, computer system 500 performs specific operations by processor 504 when executing one or more sequences of one or more program instructions stored in system memory 506. Such program instructions may be read into system memory 506 from another computer readable medium, such as storage device 508. In some embodiments, hard-wired circuitry may be used in place of or in combination with software program instructions to implement embodiments of the invention.

Graphics processor 514 performs graphics processing that otherwise would be completed using various software routines executed on processor 504. For example, graphics processor 514 can draw polygons and lines, perform alpha-blending to change the appearance of certain graphical features, perform texture mapping with texture maps, animate borders, transform graphical objects using native functions, and other graphic operations. Graphics processor 514 improves overall system and graphics performance by executing these functions (e.g., standard Open Graphics Library (OpenGL) or Direct3D function calls) in hardware rather than in software. Using these standard functions can also simplify the implementation of the processes described below. According to certain embodiments of the invention, however, software emulation of the OpenGL or Direct3D functions may be used rather than using a dedicated graphics processor 514. Certain embodiments of the invention may describe specific OpenGL functions. However, it is understood that equivalent Direct3D or other functions may also be used in their place.

It should be appreciated that the term "computer readable medium" refers to suitable medium that participates in providing program instructions to processor 504 and graphics processor 514 for execution. Such a medium may take many forms, including but not limited to, non-volatile media, volatile media, and transmission media. Non-volatile media may include, for example, optical or magnetic disks, such as storage device 508. Volatile media may include dynamic memory, such as system memory 506. Transmission media includes coaxial cables, copper wire, and fiber optics, including wires that comprise bus 502. Transmission media can also take the form of acoustic or light waves, such as those generated during radio wave and infrared data communications. Common forms of computer readable media includes, for example, magnetic mediums (e.g., floppy disk, flexible disk, hard disk, magnetic tape, and other magnetic mediums), optical mediums (e.g., compact disc read-only memory (CD-ROM) and other optical mediums), physical medium with patterns (e.g., punch cards, paper tape, any other physical mediums), memory chips or cartridges, carrier waves, (e.g., RAM, programmable read-only memory (PROM), erasable programmable read-only memory (EPROM), flash memory, and other memory chips or cartridges), and any other medium from which a computer can read.

In some embodiments, execution of the sequences of program instructions to practice the embodiments may be performed by a single computer system 500. In other embodiments, two or more computer systems 500 coupled by communication link 522 (e.g., local area network (LAN), public switched telephone network (PSTN), wireless network, and other communication links) may perform the sequence of program instructions to practice the embodiments in coordination with one another. In addition, computer system 500 may transmit and receive messages, data, and instructions, including program, i.e., application code, through communication link 522 and communication interface 512. Received program instructions may be executed by processor 504 as the program instructions are received, and/or stored in storage device 508, or other non-volatile storage for later execution.

Figure 6:
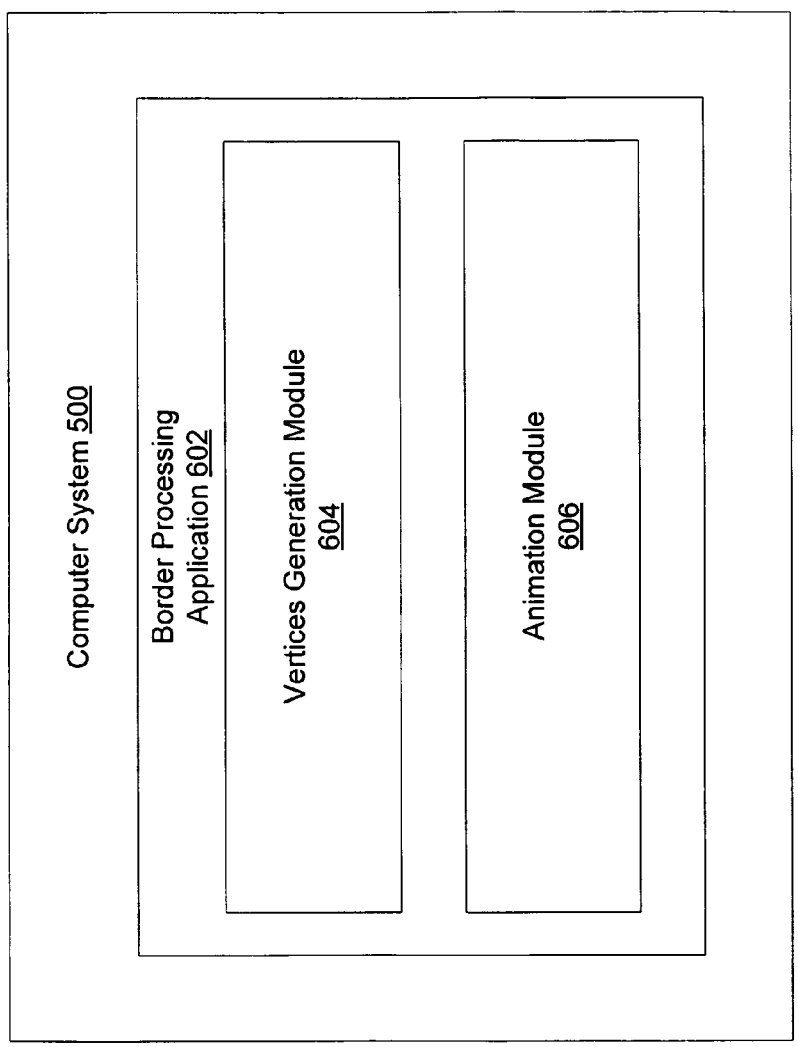
FIG. 6 is a simplified block diagram of an exemplary system for processing borders, in accordance with an embodiment.

FIG. 6 is a simplified block diagram of an exemplary system for processing borders, in accordance with an embodiment. As shown in FIG. 6, border processing application 602 may be processed by computer system 500. In the embodiment of FIG. 6, border processing application 602 includes vertices generation module 604 and animation module 606. It should be appreciated that in other embodiments, border processing application 602 may include fewer or more modules apart from those shown in FIG. 6. For example, in another embodiment, border processing application 602 does not include animation module 606 as the computations associated with animating the borders may be transferred to a graphics processor.

In general, border processing application 602 is configured to animate a border of a selected portion of an image such that the pixels that comprise the border move in one direction within the border. As explained in more detail below, in an embodiment, vertices generation module 604 is configured to generate vertices associated with the border in a sequential order wherein the sequential order defines a direction of movement of the border. As explained in more detail below, animation module 606 is configured to animate the pixels that comprise the border such that the pixels move in a direction within the border.

Figure 7:
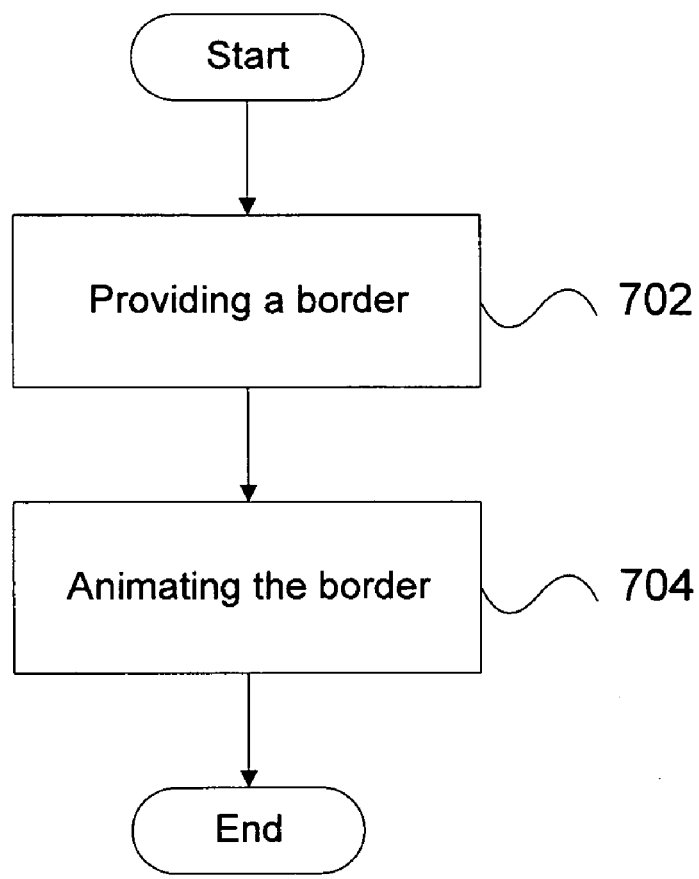
FIG. 7 is a flowchart diagram of a high level overview of an exemplary method for processing a border, in accordance with an embodiment.

FIG. 7 is a flowchart diagram of a high level overview of an exemplary method for processing a border, in accordance with an embodiment. As shown in FIG. 7, a border or a contour is provided in operation 702. As used herein, it should be noted that the terms "border" and "contour" may be used interchangeably. The border defines a boundary associated with a selected portion of an image and can be graphically represented as pixels. In an embodiment, the boundary may be comprised of a sequence of vertices that specify a set of one or more polygons. The border may be generated by a variety of border generation algorithms (e.g., boundary following algorithm). In an embodiment, the border may be provided to or, in another embodiment, generated by the border processing application.

After the border is provided, the border is animated in operation 704 such that the pixels of the border move in one direction within the border. For example, the border may be a closed path composed of a finite number of line segments (e.g., a polygon). In an embodiment, the direction of movement may be parallel to the line segments of the border. In another exemplary embodiment, the border is animated such that the border rotates in a clockwise or counterclockwise direction. The direction of movement identifies a location of the selected portion of an image and the location is identified relative to the direction. As discussed above, in an embodiment, selected portion can be located towards a side perpendicular to line segments that comprise the border and the side can be identified by the direction of movement of the line, as discussed above. For example, in an embodiment, the border can rotate in a clockwise direction and the clockwise direction identifies the location of the selected portion as outside the border. Alternatively, in another embodiment, the clockwise direction can identify the location of the selected portion as inside the border. In another exemplary embodiment, the border can rotate in a counterclockwise direction and the counterclockwise direction can identify the location of the selected portion as outside the border. Alternatively, the counterclockwise direction can identify the location of the selected portion as inside the border.

Figure 8:
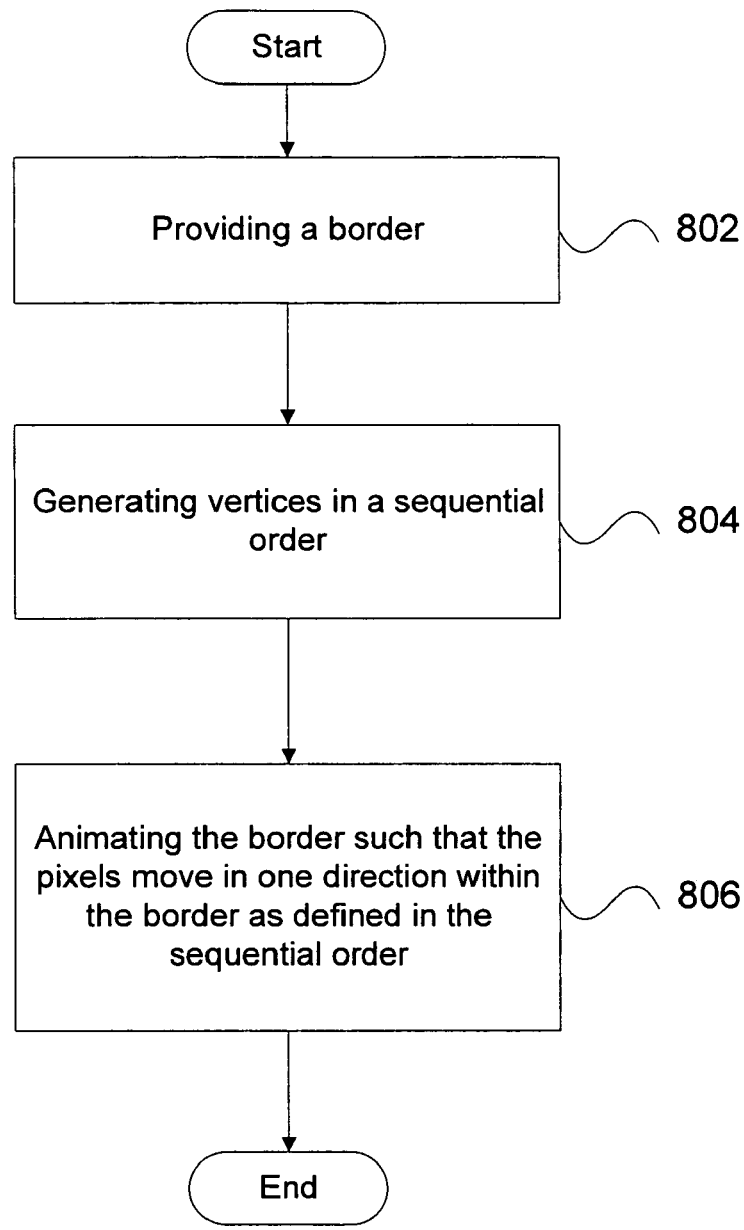
FIG. 8 is a flowchart diagram of a high level overview of another exemplary method for processing a border, in accordance with another embodiment.

FIG. 8 is a flowchart diagram of a high level overview of another exemplary method for processing a border, in accordance with another embodiment. As shown in FIG. 8, a border is provided in operation 802 and vertices associated with the border are generated in a sequential order in operation 804. Vertices are points located on the border where two or more line segments meet. For example, with regard to a two-dimensional border with a polygon shape, vertices may be points located at the corners of the polygon. The vertices may be defined by coordinates (e.g., horizontal and vertical coordinates).

The border may be composed of a finite number of vertices and, in an embodiment, the vertices may be generated by reducing the border into a set of vertices. In other words, the border may be defined by a set of vertices with line segments connected to the vertices (e.g., a polygon). In an embodiment, the border may be reduced to a minimum number of vertices and a variety of polygon reduction algorithms and techniques may be used. Exemplary polygon reduction algorithms and techniques include parametric polynomial curves, parametric bivariate polynomial surface patches, and other algorithms and techniques. The vertices may be generated in a sequential order and, as explained in more detail below, the sequential order defines a direction of movement associated with the border. In an embodiment, the border processing application processes and animates the vertices according to the sequential order. In another embodiment, the vertices are communicated to a graphics processor in the sequential order.

After the vertices are generated, as shown in operation 806, the border is animated such that the pixels that comprise the border move in one direction within the border as defined by the sequential order. Borders may be animated by a variety of animation techniques. For example, in an embodiment, an image or a texture map that comprises the border is mapped onto the border. In other words, one or more texture maps may be applied to modify the colors of the pixels along the border. Such mapping is known as texture mapping and the texture map may be mapped onto the border using many, known texture mapping techniques. After the texture map is mapped onto the border, the border can be animated such that the texture map moves in a direction within the border. For example, in an embodiment, the texture map is translated in a direction within the border to animate the border. In another embodiment, the texture map is translated in a direction with the border as defined by the sequential order. As will be explained in more detail below, an exemplary translation technique is the application of coordinate transformation to the mapped texture. The texture map may be translated proportional to the amount of time such as to animate the texture map within the border.

Figure 9:
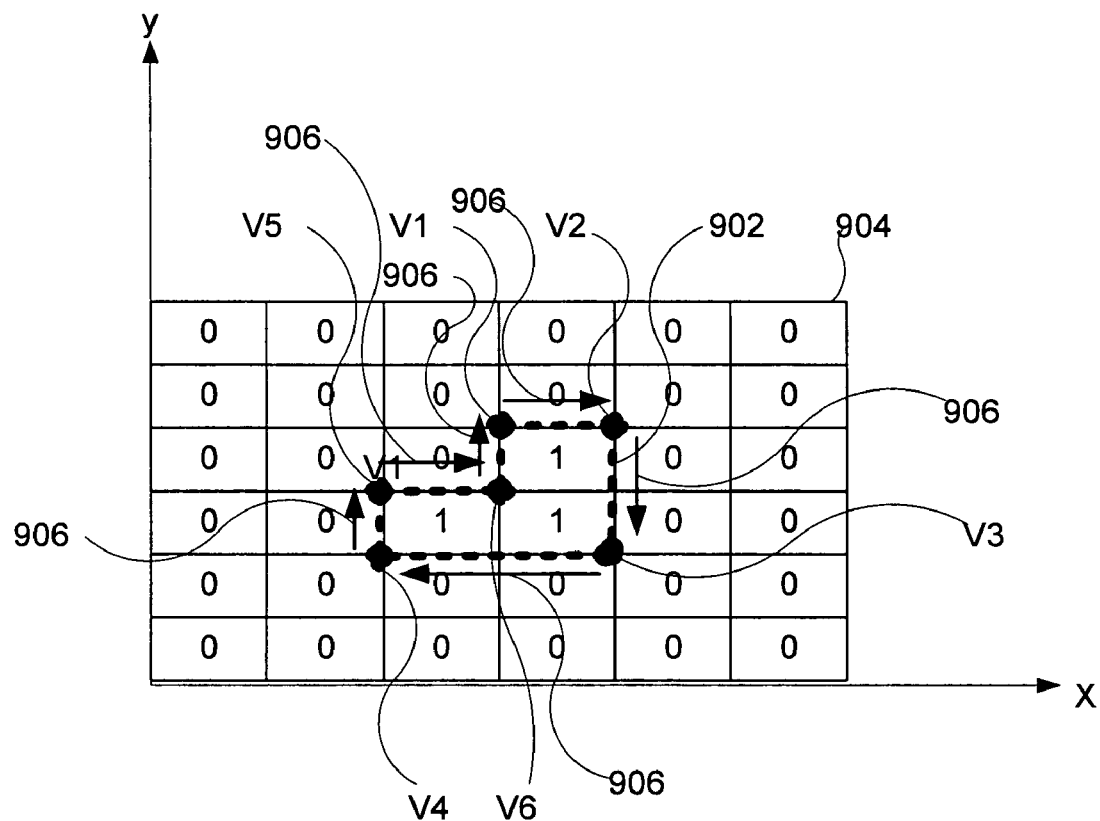
FIG. 9 is a diagram of an exemplary array illustrating the generation of vertices in a sequential order, in accordance with an embodiment.

FIG. 9 is a diagram of an exemplary array illustrating the generation of vertices in a sequential order, in accordance with an embodiment. As shown in FIG. 9, array 904 is an arrangement of binary values in rows and columns. Array 904, for example, can represent an image. Each binary value defines the selection of a portion (or a block) of array 904 (e.g., a pixel in an image). Here, a value of one defines the selection of the portion of array 904. On the other hand, a value of zero defines the non-selection of the portion of array 904. Border 902 defines a boundary of the selected portions of array 904 and the border is reduced to or composed of vertices 1-6. It should be appreciated that border 902 may be composed of more vertices but, in this example, vertices 1-6 are the minimal number of vertices that can define the border and additional vertices would be redundant. Therefore, border 902 is reduced into a minimum of six vertices 1-6. An exemplary technique for reducing the border into a minimum number of vertices is to eliminate one or more vertices along a straight line because such vertices located on the straight line may be redundant.

In this embodiment, vertices 1-6 are generated in a sequential order and the sequential order defines a direction of movement associated with border 902. As shown in FIG. 9, border 902 is rotating in a clockwise direction as indicated by reference arrows 906 and the selected portions are located toward the right of direction of movement. Therefore, the clockwise direction identifies the portions (i.e., blocks) as inside border 902. The following Table A shows the sequential order of vertex generation associated with border 902.

TABLE A

| Vertex Number | Vertex |
| --- | --- |
| 1 | $(x_1, y_1, t_1)$ |
| 2 | $(x_2, y_2, t_2)$ |
| 3 | $(x_3, y_3, t_3)$ |
| 4 | $(x_4, y_4, t_4)$ |
| 5 | $(x_5, y_5, t_5)$ |
| 6 | $(x_6, y_6, t_6)$ |
| 1 | $(x_1, y_1, t_1)$ |

As shown in Table A, vertices 1-6 can be identified by a set of horizontal x coordinates and vertical y coordinates. With reference to FIG. 9 and Table A, vertices 1-6 are generated sequentially along a clockwise direction. For example, in Open GL, the function calls "begin border," "draw vertex 1," "draw vertex 2," "draw vertex 3," "draw vertex 4," "draw vertex 5," "draw vertex 6," and "draw vertex 1" can be used in the specified sequential order to draw vertices 1-6. Since border 902 is a closed loop, vertex 1 is repeated at the end to close the loop. In addition to horizontal x coordinate and vertical y coordinate, a third number called a texture coordinate t may be associated with each of the vertices 1-6, in accordance with an embodiment of the invention. The texture coordinate t indicates the arc length from the first vertex (i.e., vertex 1) and is used to locate or apply the texture map on border 902. The arc length is the cumulative geometric distance between vertices 1-6. In the example of FIG. 9, with each block of array 904 having a geometric distance of one, $t_1=0$, $t_2=1$, $t_3=3$, $t_4=5$, $t_5=6$, $t_6=7$, and $t_7=8$.

A graphics processor can be configured to interpret texture coordinates as expressing a periodic value. This interpretation can be done by instructing the graphics processor to extract the fractional portion of a texture coordinate or discard all but the fractional portion of a texture coordinate such that, for example, the texture coordinates 0.2, 1.2, 2.2, and 3.2 specify the same position in the texture (i.e., 0.2). Therefore, as a texture coordinate crosses an integer boundary, the texture coordinate wraps around to the beginning of the texture. As the polygon is drawn, the texture coordinate is subject to a transformation as specified by a texture transformation matrix, which is a part of the graphics processor state. The texture transformation can apply a scaling to the texture coordinate prior to accessing the associated texture map. Considering the processes of drawing a single line segment of border 902, the graphics processor computes a texture coordinate for each pixel along the line segment by interpolating (e.g., linear interpolation) the associated texture coordinates of two vertices (e.g., vertices 1 and 2, vertices 3 and 4, and other vertices) that comprise the endpoints of the line segment. The texture transformation matrix then scales the interpolated texture coordinate. The scaled texture coordinate is then used to index a pixel in the one-dimensional texture map that defines the color pattern to be drawn along border 902.

For example, the texture map may comprise two pixels, a black pixel and a white pixel. Here, if the scaled texture coordinate is in the range from 0 to 0.5, then a white pixel is drawn. However, if the scaled texture coordinate is in the range from 0.5 to 1.0, then a black pixel is drawn. Since the fractional portion of the scaled texture coordinate is used (or extracted), the black and white pixels are drawn in a repeating pattern along border 902, which results in dotted line segments shown in FIG. 9. Since the original texture coordinates are proportional to the arc length along border 902, the lengths of the white and black portions of the pattern or texture map are uniform throughout the border. The scaling value of the texture transformation controls the size of pixels of the black and white dots or dashes. It should be appreciated that there are numerous patterns or texture maps that can be drawn, some of which are described below.

In an embodiment, to animate the texture map on border 902, the texture coordinates are modified using the texture transformation matrix. The texture transformation matrix may be modified once for each display update such that the texture transformation matrix represents a translation of texture coordinates proportional to time in addition to scaling the texture coordinates as described above. For example, the texture transformation matrix can be configured to modify a texture coordinate to become, as illustrated in the following equation:

$$t' = S*(t + v*s) \quad (1.0)$$

where t' is the modified texture coordinate, s is the current animation frame in time (e.g., seconds), v is a constant that controls the translation velocity, and S is the scaling parameter that determines the length in pixels of a single period of the texture map along border 902. As a result, once border 902 is computed, the data associated with the border (e.g., a display list or vertex array) can be transferred to the graphics processor. On each frame update, the texture transformation matrix is modified and the graphics processor draws border 902 based on the data associated with the border received by the graphics processor. To draw border 902, the graphics processor indexes the texture map based on the modified texture coordinates. In addition, it should be noted that the translation velocity v of Equation 1.0 may be changed such as to reverse the direction of movement without changing the data associated with the border that is stored in the graphics processor. For example, if selection of a portion of array 904 is inverted such that the selection is outside border 902, then translation velocity v may be negated to reverse the direction of movement associated with the border.

Figure 10:
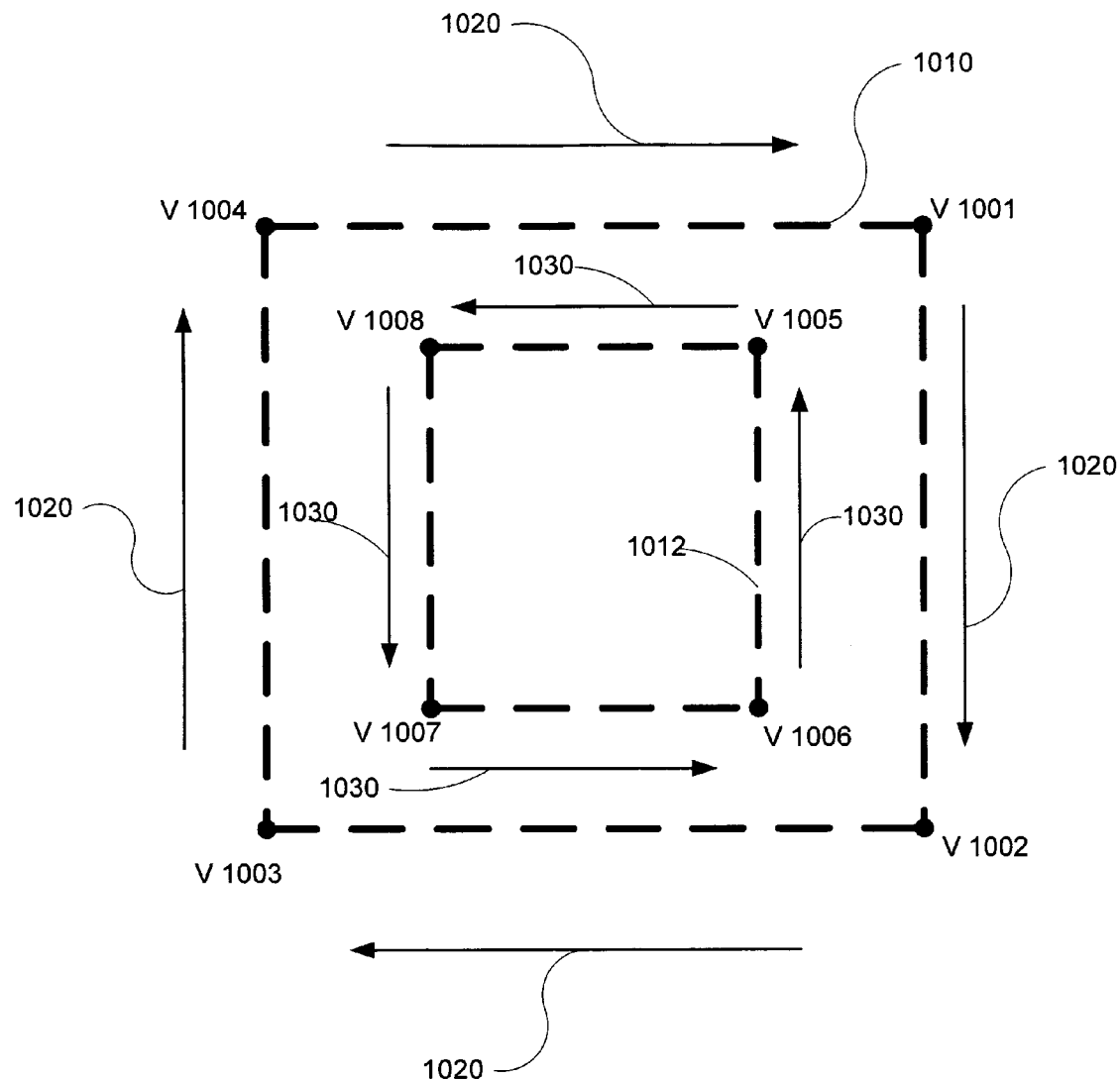
FIG. 10 is an exemplary diagram illustrating the generation of vertices of two different borders in different sequential orders, in accordance with an embodiment.

FIG. 10 is an exemplary diagram illustrating the generation of vertices of two different borders in different sequential orders, in accordance with an embodiment. FIG. 10 shows borders 1010 and 1012 rotating in different directions. Border 1010 is composed of vertices 1001-1004 and rotates in a clockwise direction as indicated by reference arrows 1020. Border 1012 is composed of vertices 1005-1008 and rotates in a counterclockwise direction as indicated by reference arrows 1030. In an embodiment, vertices 1001-1008 are generated in two, different sequential orders and the sequential orders define two movement directions. Since borders 1010 and 1012 rotate in opposite directions, vertices 1001-1004 and vertices 1005-1008 are generated in opposite sequential orders. The following Table B shows the sequential orders of vertex generation associated with borders 1010 and 1012.

TABLE B

| Border 1010 | | Border 1012 | |
| --- | --- | --- | --- |
| Vertex Number | Vertex | Vertex Number | Vertex |
| 1001 | $(x_{1001}, y_{1001}, t_{1001})$ | 1005 | $(x_{1005}, y_{1005}, t_{1005})$ |
| 1002 | $(x_{1002}, y_{1002}, t_{1002})$ | 1008 | $(x_{1008}, y_{1008}, t_{1008})$ |
| 1003 | $(x_{1003}, y_{1003}, t_{1003})$ | 1007 | $(x_{1007}, y_{1007}, t_{1007})$ |
| 1004 | $(x_{1004}, y_{1004}, t_{1004})$ | 1006 | $(x_{1006}, y_{1006}, t_{1006})$ |
| 1001 | $(x_{1001}, y_{1001}, t_R)$ | 1005 | $(x_{1005}, y_{1005}, t_Z)$ |

As shown in Table B, from top to bottom row, vertex 1001 associated with border 1010 is generated first, vertex 1002 is generated second, vertex 1003 is generated third, vertex 1004 is generated fourth, and, to close the loop, vertex 1001 is again generated. This sequential order defines a clockwise rotation of border 1010. With border 1012, vertex 1005 is generated first, vertex 1008 is generated second, vertex 1007 is generated third, vertex 1006 is generated fourth, and, to close the loop, vertex 1005 is again generated. This sequential order defines a counterclockwise rotation of border 1012.

In another embodiment, vertices 1001-1008 may be generated in a different order, but the vertices are stored for subsequent use or communicated to a graphics processor in the sequential order described above. Here, vertices 1001-1008 may be stored in a computer readable medium such that the sequential orders of the vertices are preserved. As a result, vertices 1001-1008 may be retrieved or read according to the stored sequential orders when borders 1010 and 1012 are animated. Alternatively, if a graphics processor is configured to animate borders 1010 and 1012, vertices 1001-1008 may be communicated to the graphics processor in the sequential orders such that the graphics processor can animate the borders in the directions as defined by the sequential orders.

Figure 11A:
FIGS. 11A-11D are diagrams of exemplary texture maps that comprise borders, in accordance with various embodiments of the present invention.
Figure 11B:
Figure 11C:
Figure 11D:

FIGS. 11A-11D are diagrams of exemplary texture maps that comprise borders, in accordance with various embodiments. As discussed above, a texture map or an image comprising of pixels may be mapped onto the border. As a result, the texture map provides the texture or defines the appearance of the border. It should be appreciated that the texture map may include a variety of images. For example, in an embodiment, FIG. 11A shows that texture map can define a dashed line. In another exemplary embodiment, as shown in FIG. 11B, the texture map can define a dotted line. Alternatively, in still another exemplary embodiment, FIG. 11C shows that texture map can define a dash-dotted line. In addition to lines, in another embodiment, FIG. 11D shows that texture map can define a graduated color pattern. The color pattern can be shades of gray that gradually gets darker from left to right. Another color pattern can be a variety of different colors.

In summary, the above-described embodiments provide methods and systems for animating a border such that the border rotates in one direction or that the pixels of the border move in one direction within the border. Since the direction identifies a location of the selected portion of the image, a user may be able to distinguish a selected portion from a non-selected portion of the image even without a complete view of the image and/or border.

Although the foregoing examples have been described in some detail for purposes of clarity of understanding, the embodiments are not limited to the details provided. There are many alternative ways of implementing the embodiments. The disclosed examples are illustrative and not restrictive.

What is claimed is:

1. A method, comprising:
   using a computer for performing:
      providing a border associated with a selected portion of an image, the border comprising a plurality of pixels;
      determining a direction of movement for the plurality of pixels according to which side of the border the selected portion of the image is located on; and
      animating the plurality of pixels to move in the determined direction within the border.

2. The method of claim 1, further comprising generating in a sequential order a plurality of vertices associated with the border, the sequential order matching the direction of movement of the plurality of pixels within the border.

3. The method of claim 2, further comprising storing the vertices wherein the sequential order of the plurality of vertices is preserved.

4. The method of claim 1, wherein the plurality of pixels move in a rotating direction.

5. The method of claim 1, wherein the border comprises a plurality of line segments, and the direction of movement of the plurality of pixels is parallel to the plurality of line segments comprised within the border.

6. The method of claim 5, wherein the selected portion of the image is located on a side that is perpendicular to the line segments associated with the border.

7. The method of claim 1, wherein the selected portion of the image is located towards a right of the direction of movement of the plurality of pixels.

8. The method of claim 1, wherein the selected portion of the image is located towards a left of the direction of movement of the plurality of pixels.

9. A computer-readable storage medium storing computer instructions executable by a computer to perform:
   providing a contour associated with a selected portion of an image; and
   determining a direction of rotation for the contour according to which side of the contour the selected portion of the image is located on; and
   animating the contour to rotate in the determined direction.

10. The medium of claim 9, wherein the computer instructions are further executable to perform:
    reducing the contour into a plurality of vertices; and
    storing the plurality of vertices in a sequential order, the sequential order matching the direction of rotation.

11. The medium of claim 9, wherein the contour encloses the selected portion of the image.

12. The medium of claim 9, wherein the contour rotates in a clockwise direction, and the clockwise direction indicates that the selected portion of the image is outside the contour.

13. The medium of claim 9, wherein the contour rotates in a clockwise direction, and the clockwise direction indicates that the selected portion of the image is inside the contour.

14. The medium of claim 9, wherein the contour rotates in a counterclockwise direction, and the counterclockwise direction indicates that the selected portion of the image is outside the contour.

15. The medium of claim 9, wherein the contour rotates in a counterclockwise direction, and the counterclockwise direction indicates that the selected portion of the image is inside the contour.

16. A system, comprising:
    a memory configured to store a border processing application;
    a processor in communication with the memory, the processor being configured to execute the border processing application stored in the memory, the border processing application comprising program instructions for:
       providing a border associated with a selected portion of an image;
       providing a texture map;
       reducing the border into a plurality of vertices and a plurality of texture coordinates associated with the plurality of vertices;
       determining a direction of movement for the texture map according to which side of the border the selected portion of the image is located on;
       storing the plurality of vertices and the plurality of texture coordinates in a sequential order, the sequential order matching the determined direction of movement of the texture map; and
       communicating the texture map, the plurality of vertices, and the plurality of texture coordinates to a graphics processor;

wherein the graphics processor is in communication with the memory and the processor, and the graphics processor comprises logic to animate the texture map to move according to the sequential order that matches the determined direction within the border.

17. The system of claim 16, wherein the plurality of vertices and the plurality of texture coordinates are communicated to the graphics processor in the sequential order.

18. The system of claim 16, wherein the logic to animate the texture map comprises:

logic configured to map the texture map onto the border; and logic configured to translate the texture map in the determined direction within the border.

19. The system of claim 16, wherein the logic to animate the texture map comprises:

logic configured to modify the plurality of texture coordinates using a texture transformation matrix, the plurality of texture coordinates that are scaled defining a plurality of modified texture coordinates; and logic configured to index the texture map based on the plurality of modified texture coordinates.

20. The system of claim 19, wherein the logic configured to modify the plurality of texture coordinates comprises logic configured to translate the plurality of texture coordinates in the determined direction within the border.

21. The system of claim 16, wherein the program instructions for reducing the border comprises program instructions for reducing the border into a minimum number of the plurality of vertices.

22. The system of claim 16, wherein the texture map defines a dotted line.

23. The system of claim 16, wherein the texture map defines a dashed line.

24. A method, comprising:

using a computer for performing:

providing a border associated with a selected portion of an image;

providing a texture map;

determining a direction of movement for the texture map according to which side of the border the selected portion of the image is located on;

generating in a sequential order a plurality of vertices associated with the border to match the determined direction within the border; and animating the border wherein the texture map moves according to the sequential order that matches the determined direction within the border.

25. The method of claim 24, wherein the animating the border comprises:

mapping the texture map onto the border; and translating the texture map in the determined direction within the border according to the matching sequential order.

* * * * *

UNITED STATES PATENT AND TRADEMARK OFFICE
CERTIFICATE OF CORRECTION

PATENT NO.       : 7,656,408 B1
APPLICATION NO.  : 11/351802
DATED            : February 2, 2010
INVENTOR(S)      : Brandt et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1029 days.

Signed and Sealed this

Thirtieth Day of November, 2010

David J. Kappos
*Director of the United States Patent and Trademark Office*